Fig. 2

INVENTOR
FRANKLIN H. LINEBACK
by: Wolfe, Hubbard, Voit & Osann
ATTYS.

Nov. 19, 1968 F. H. LINEBACK 3,412,238
SYSTEM FOR MEASURING AND ACCUMULATING DATA
REPRESENTED ON BLUEPRINTS OR THE LIKE
Filed Feb. 9, 1965 7 Sheets-Sheet 3

INVENTOR
FRANKLIN H. LINEBACK by: Wolfe, Hubbard, Voit & Osann
ATTYS.

FIG. 4

"DEVICES", "BRANCH", & "POWER" MODES -- COUNT BY ONE

FIG. 5
"BRANCH", "POWER", & "FEEDER" MODES -- CONDUIT SIZES

United States Patent Office 3,412,238
Patented Nov. 19, 1968

3,412,238
SYSTEM FOR MEASURING AND ACCUMULATING DATA REPRESENTED ON BLUEPRINTS OR THE LIKE
Franklin H. Lineback, Des Plaines, Ill., assignor to Henry Newgard & Company, Chicago, Ill., a corporation of Illinois
Filed Feb. 9, 1965, Ser. No. 431,292
9 Claims. (Cl. 235—92)

ABSTRACT OF THE DISCLOSURE

This invention is an apparatus for aiding a cost estimator by converting information on an engineering drawing or blueprint into data pulses. A manually operated device with a magnetic wheel adapted to be rolled over a drawing produces pulses representing lengths or distances. An auxiliary button switch on the same manual means is used to generate single pulses representing the number of fixtures shown on the drawing. The data pulses are transmitted to a central unit where they are totalized. The central unit includes a plurality of mode selection switches which permit the incoming data pulses to be analyzed in several different manners.

This invention relates to the art of measuring distances, counting units, and totalizing the results of the respective measurements and counts. More particularly, it concerns the provision of an automatic apparatus for use in estimating the quantities of material corresponding to scaled drawings of a structure. The embodiment herein described was originally developed for electrical estimating work, and accordingly the description herein will be confined to a specific device, it being clearly understood that the principles here described are applicable for estimating the requirements of pipe, beams, moldings, girders, or like structural materials, depending upon the requirements of an estimating job.

Computing the electrical materials requirements for large buildings is an arduous, time consuming, and highly skilled task, generally involving the tedious measurement and interpretation of blueprints, the recording of voluminous data, and the final compilation of lengths, sizes, and units as a preliminary to computing the final bill of materials and the estimated cost of the job. The time requirements of even the most skillful estimator are substantial, and when it is recognized that an electrical contractor may estimate and bid on a number of jobs before being awarded the contract for one, it may readily be seen that the cost of preparing estimates represents a substantial burden.

In any one job there may be, and usually are, several different sizes and wall thicknesses of conduit, ells, couplings, terminations, and conduit supports, different conductor sizes, different numbers of conductors per conduit, and literally scores of different electrical devices. The estimator must keep track of all of these and, when estimating by conventional hand techniques, must take care that each representative distance on a blueprint is prop-erly converted to lengths, and this figure posted in the appropriate conduit size column, the wire size column, and the supports and hangers column.

An object of the invention therefore is to provide a measuring and counting apparatus which enables the estimator to keep track of the various materials and types of materials involved in a job estimate. An associated objective is to provide such apparatus which separately records the appropriate conductor size, number of conductors per conduit, conduit size and type, and supports or hangers, in response to a single length measurement on a blueprint.

An overall object is to provide a measuring and counting apparatus which measures or counts all conductors, conduits, accessories, and devices usually encountered in electrical estimating work, but provided with sufficient versatility to accommodate special jobs and materials.

A further objective is to provide such apparatus having built-in, virtually error-proof, electrical code compliance so that the estimator cannot inadvertently provide too small or too thin a conduit for given numbers and sizes of conductors.

Still another object is to provide a measuring and counting apparatus which, in its simplest form, can be made with standard uncomplicated electrical and electromechanical devices, yet which has circuitry that can be modified or improved by the use of solid state memory units, electronic counters, direct feedout to computers, or automatic printout, paper punch, or magnetic tape readout.

A major objective of the inventive apparatus is to provide results in a form that can easily be transferred to a bill of material without encountering what has previously been a characteristically large volume of paper work and computation. An associated objective, of course, is to save the valuable time of an estimator and to reduce the possibility of error in his work.

Another objective is to provide a manually operated length or distance measuring device for use with the complete apparatus.

An overall aim and object of the invention is to provide a measuring and counting apparatus that is simple, accurate, dependable, and economical.

Yet a further object is to provide pulse count circuitry that conserves on the number of necessary components by utilizing each pulse counter for a plurality of different counting operations.

Other and more particular objectives and features of the invention will become apparent as the description of the invention proceeds below, which description is to be taken in conjunction with the attached drawings wherein:

*Drawing conventions*

In each of the figures listed above, the same number is used to designate the identical component part. Since in many cases a single switch is a multiple pole switch with each pole shown separately on FIGS. 4, 5 or 6, subscripts have been used throughout. Thus, "TW" switch 161 on FIG. 2a is represented by switches 161a through 161i on FIGS. 5 through 6.

Figure 1:
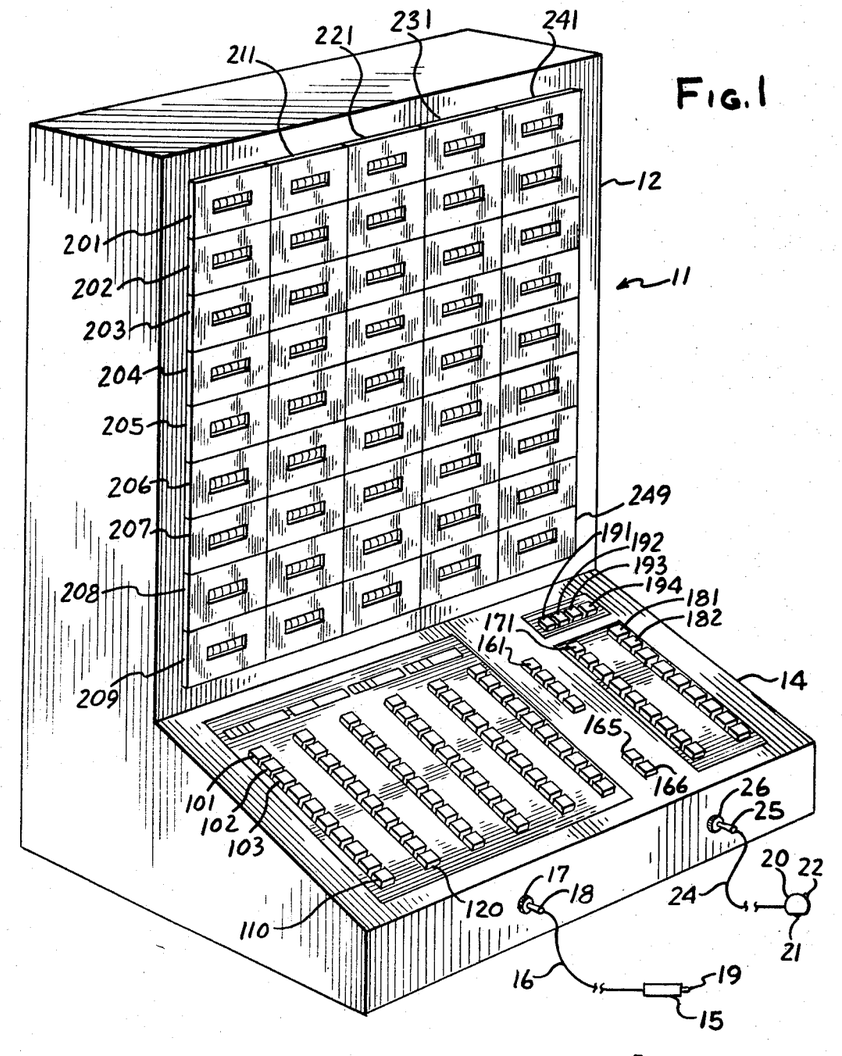
FIGURE 1 is a perspective of the complete measuring and counting apparatus of the invention, in which the numerical designations of certain of the component parts have been deleted for clarity.
Figure 5:
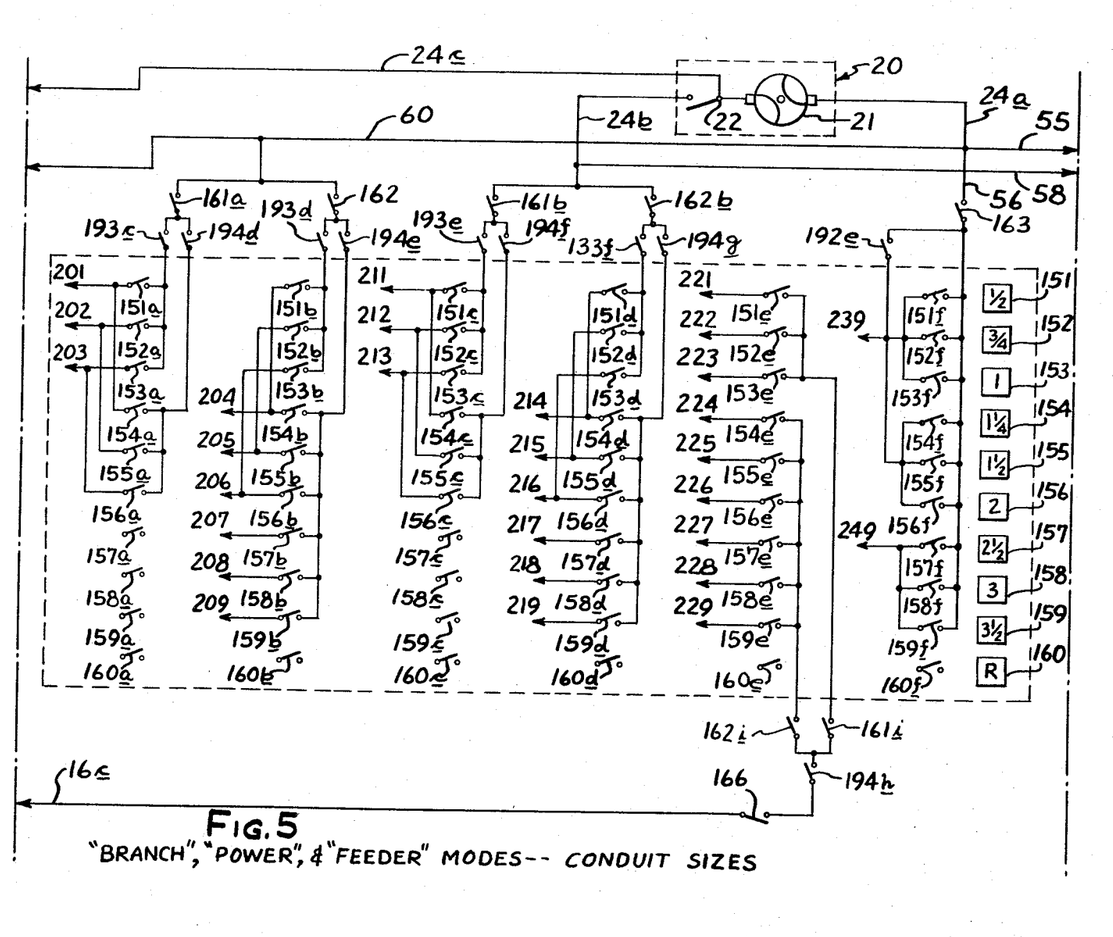
FIG. 5 is the center portion of the circuit diagram.
Figure 6:
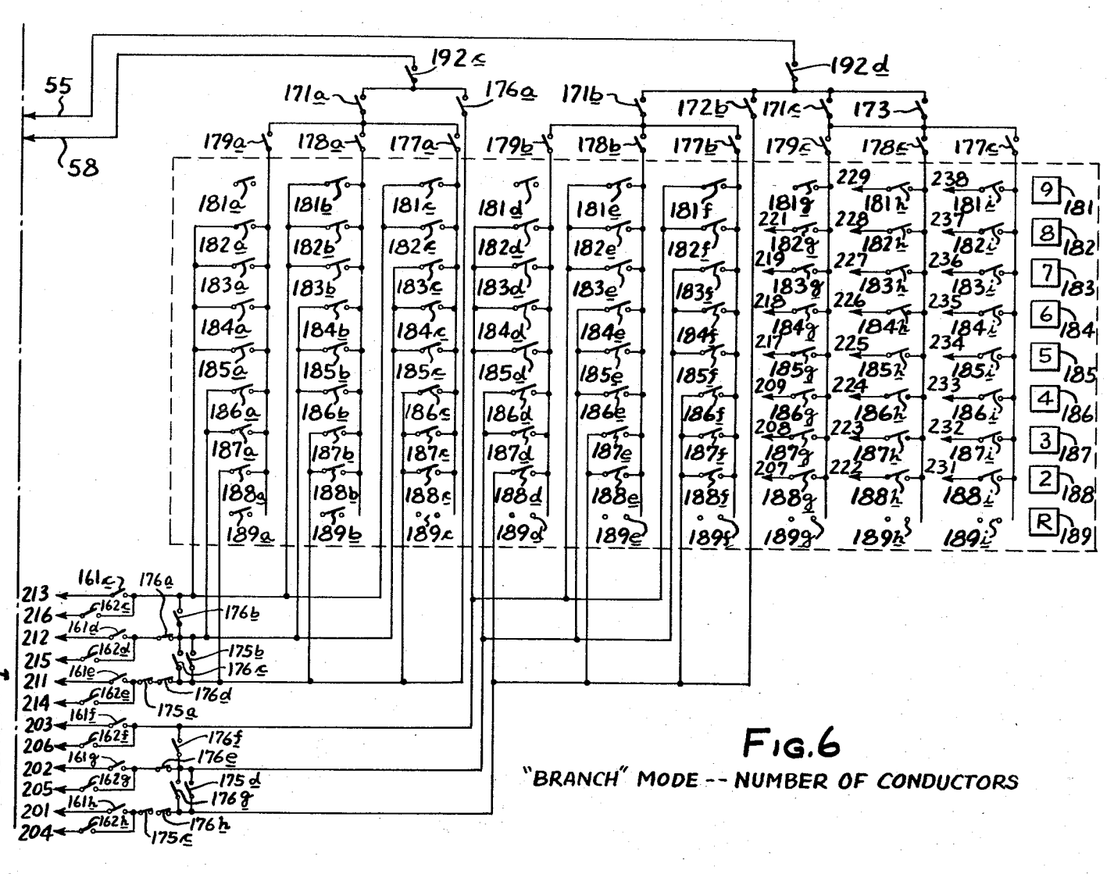
FIG. 6 is the right-hand portion of the circuit diagram.

Additionally, the electromechanical counters have been positioned and numbered in FIG. 1 coresponding to the positions and numbers of their associated switch keys, except that the 200 series has been employed for the electromechanical counters and the 100 series for switches. Thus, the numerical series 101 through 199 denotes switches or switch components and the series 201–249 designates electromechanical counters corresponding respectively to switches 101–149. For clarity, the electromechanical counters are shown only in FIG. 4, whereas lines extending to the counters in FIGS. 5 and 6 are denoted merely by an arrowhead adjacent a number corresponding to the electromechanical counter to which the particular line is connected. All counters are grounded.

*Complete device*

Referring first to FIG. 1, the complete measuring and counting apparatus 11 is shown in perspective view. Apparatus 11 comprises rack 12 of electromechanical counters 201 through 249, and so arranged to be readily visible to the estimator upon completion of an estimating job. Such counters 201–249 are of the type having a series of number wheels arranged along a common axis, with a solenoid adapted to increase the recorded count by one unit for each electrical impulse received by the solenoid.

Figure 2:
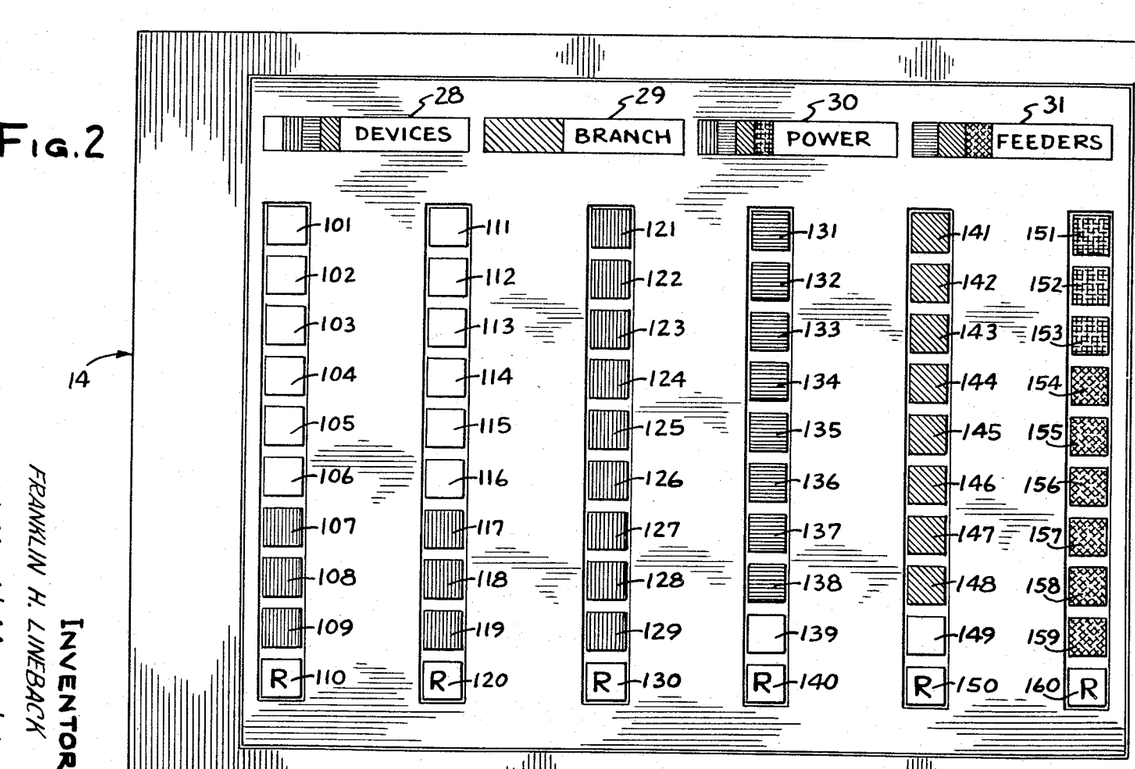
FIGS. 2 and 2a show the keyboard or control panel by means of which the appropriate modes and functions of the apparatus are selected.
Figure 2A:
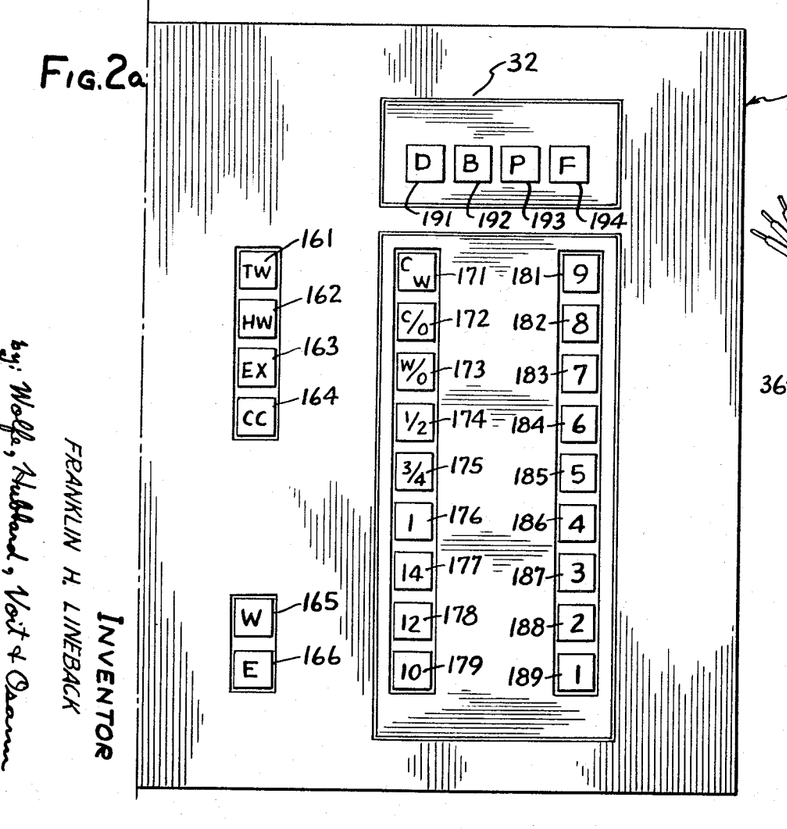

Arranged on a console extending forwardly and downwardly of rack 12 is the console of keyboard 14, the details of which are best shown in FIGS. 2 and 2a. Keyboard 14 permits the estimator to select the appropriate counters to record or totalize the material he wishes to measure or count.

Counting individual devices is accomplished with a manually operated switch 15 which communicates with apparauts via line 16 and plug 18, and is of a size sufficiently small that it can be held easily in the hand while the operator is depressing switch button 19 with his thumb or finger.

Measurement of lengths of lines on blueprints corresponding to distances or lengths of wire, conduit, or the like to be installed is done with a distance measuring device or "pacer" 20 provided with a rotatable wheel 21 which is moved over the blueprint and with a manually operated push button 22 for counting units, as will be described more fully hereinafter. Pacer 20 is connected to aparatus 11 via line 24 and plug 25. If desired, plug 25 and its associated jack 26, and/or plug 18 and its jack 17, may be located remote from the complete apparatus 11.

*Keyboard*

Turning to FIGS. 2 and 2a a plan view of keyboard 14 is shown. Inviting attention to the push button switches identified as 101 through 160 respectively, it will be noted that these are arranged in six banks of ten push button switches each. The first or left-most bank is representative of the next five banks or columns, and contains switches 101 through 109, with "R" or "release" switch 110 adapted to disengage any of the push-to-lock switches 101 through 109. These switches 101 through 109 do not have lock-out bars in the preferred embodiment of the invention, so it is possible to push more than one switch at a time and so engage more than one electromechanical counting unit 201–249. Similarly, banks of push button switches or keys 111–149 are likewise respectively released by the push button switch or key "R" at the bottom of the respective column.

Switch keys 151 through 160 are provided with visible indicia on their top surfaces corresponding to conduit sizes. The top three switch keys 151–153 select conduit sizes when the apparatus is operating in the "power" mode to be explained hereafter. Switch keys 154 to 159 select conduit sizes for the "feeder" mode. The bank of switch keys 151 through 160 is provided with a lock-out bar so that only one conduit size can be selected; this prevents the estimator from inadvertently pressing two keys simultaneously.

Switch keys 101 through 109, 111 through 119, 121 through 129, 131 through 139, 141 through 149, and 151 through 159 are advantageously color coded, with the color key presented on a series of labels 28–31 extending along the top of keyboard 14. Switch keys 101–106, 111–116, 139, and 149 are white; 107–109, 117–119, and 121–129 are red; 131–138 are blue; 141–148 are green; 151–153 are yellow; and 154–159 are orange.

On the "devices" label 28 there are strips of white, red, blue and green, indicating that all switches so colored are available when the apparatus is in the "devices" mode to count individual devices.

Similarly, the "branch" label 29 bears a green color, indicating that green switch keys 141–148 are available to count by one when the apparatus is in the "branch" mode. "Power" label 30 has red, blue, green and yellow color strips, the red and blue corresponding to the similarly colored switch keys available to count by one, that is, count individual units, in the "power" mode, and the green colored keys are available to select counters to measure lineal distances or lengths. The yellow color in "power" label 30 refers to switch keys 151–153 which select the appropriate conduit size for the "power" mode.

"Feeders" label 131 has blue, green and orange color strips, indicating that blue and green colored switch keys are available to measure lineal distances while in the "feeders" mode, the orange keys 154–159 being used to select conduit size while in this mode.

To the right of switch keys 151–160 are two banks of switch keys 161–164 and 165–166. Keys 161 and 162 are colored green; 163–164 red, and 165–166 orange. Switch keys 161 and 162 are both press-to-lock type keys and are provided with a lock-out bar to prevent both keys from being pressed simultaneously; switch key 161 is marked "TW" indicating "thin wall conduit," and switch key 162 is marked "HW" indicating "heavy wall conduit," both these switches being used in connection with the "branch," "power," and "feeders" modes. Switch keys 163 and 164 are likewise of the press-to-lock type provided with lock-out bars to prevent both from being pressed simultaneously. "EX" on switch key 163 refers to "exposed conduit" and "CC" on switch key 164 to "concealed conduit."

Switch keys 165 and 166 are spring-return keys used in connection with the "feeders" mode, the "W" on switch key 165 indicating that five feet of wire is to be added to the measured length to allow for additional wire necessary beyond the end of a conduit. Switch key 161 bears the letter "E" and is pressed whenever a conduit ell is to be counted.

To the right of keys 161–166 are two additional banks of keys, 171–179 and 181–189. These keys are activated only when the apparatus is in the "branch" mode, and are employed to select conductor or wire size, number of conductors per conduit, whether the installation is to involve conduit only, wire only, or wire plus conduit, and to select conduit size. (Conduit wall thickness in "branch" mode is selected by switch keys 161 and 162.)

Switch keys 171 through 173 bear the indicia "C and W," "C/O," and "W/O," respectively, corresponding to "conduit and wire," "conduit only," and "wire only." These three switch keys are press-to-lock and are provided with a lock-out bar preventing more than one key from being pressed.

Switch keys 174 through 176 respectively have markings corresponding to conduit size, specifically "one-half inch," "three-fourths inch," and "one inch." They too are of press-to-lock type and are provided with a lock-out bar permitting only one switch key to be depressed.

Switch keys 177, 178 and 179 are employed to select conductor size in the "branch" mode, and bear the indications "fourteen," "twelve," and "ten," corresponding to wire sizes. These keys likewise are press-to-lock and equipped with a lock-out bar.

The bank of ten keys to the right of switch keys 171–179, that is, switch keys 181–189 bear numbers corresponding to the selected number of conductors for a given installation. These keys are all of the press-to-lock type and are provided with a lock-out bar, "R" or "release" key 189 serving to release the keys 181 through 188.

Above the two banks of keys 171–189 is the "function" or "mode" selecting keyboard 32, containing four switch keys 191–194 corresponding to the four modes or functions of the apparatus. The keys respectively have the letters "D," "B," "P," and "F," corresponding to the modes "devices," "branch," "power," and "feeders." Switch keys 191–194 are of the press-to-lock type and have lock-out bars permitting only function or mode to be selected at a given time.

When "devices" switch key 191 is depressed, a series of switch actions occur (which will be described in conjunction with FIGS. 4 through 6 below) that sets up the apparatus 11 circuitry to permit forty-five different types of electrical devices to be counted. Pressing "branch" mode selector switch 192 enables the apparatus 11 to record the measurement of conductor and conduit length and to count conduit terminations, conduit supports, and eight different types of miscellaneous electrical devices; "branch" lines are those using ½", ¾", or 1" thin or heavy walled conduit.

"Power" mode selector switch 193 arranges the circuitry of apparatus 11 to permit the measurement of three-conductor wires and its associated thin or heavy walled conduit in ½", ¾", and 1" conduit sizes, and also to record the measurement of lineal distances as well as individual electrical devices. "Feeder" mode selector switch 194 sets up apparatus 11 to measure lengths of the larger diameter conduits, from 1¼" up to 3½", associated with large feeder lines, and similarly to measure the lengths of each line size.

Pacer

Figure 7:
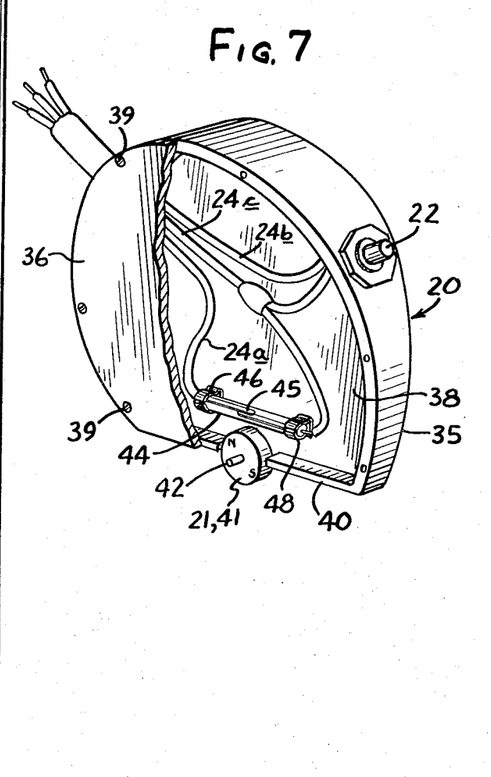
FIG. 7 shows a partial cutaway perspective of the "pacer" or manual device for measuring lengths of lines on a blueprint corresponding to distances.

"Pacer" 20, shown in a cutaway perspective in FIG. 7, is a manually operated device for producing square-wave electrical pulses in proportion to a length or distance appearing on a scaled blueprint.

Pacer 20 comprises a nonmagnetic casing 35 made of a non-ferrous metal such as brass. Casing 35 is advantageously cut from a brass tube, and is equipped with brass side plates 36 and 38 which are fastened to the tube portion by small brass or bronze screws 39. The lower portion of casing 35 comprises a flat brass strip 40 brazed in place. The width of casing 35 adjacent strip 40 is less than that at the top of casing 35 to facilitate visibility.

Protruding beyond strip 40 and journaled to side plates 36 and 38 is a small rotatable permanent magnet 21 having its poles along a diameter of the cylindrical magnet 21, and thus perpendicular to journaled shaft 42 about which magnet 21 rotates.

Normally open magnetic reed switch 44 is positioned in magnetic proximity to magnet 21; magnetic armature 45 is thus pulled downward to complete an electrical circuit each time either the north or the south pole of rotating magnet 21 is in proximity with reed switch 44. Reed switch 44 is clipped to side plate 38 by a pair of nonmagnetic clips 46, 48, and wires 24a and 24c are connected to the respective clips 46, 48.

Manually operated switch 22 is of the spring-return type and is enclosed in a hermetically sealed glass tube. It protrudes above an upper portion of pacer 20, and is connected via wire 24b and 24c into the measuring and counting apparatus. Manual switch key 22 is used during the counting and measuring operation to indicate a conduit termination, and is positioned such that an operator can press switch 22 while he is rolling magnet 21 along a blueprint.

The diameter of magnet 21 is so chosen that each rotation of the magnet as it is moved over a scaled blueprint will produce a single pulse corresponding to a preselected length of conduit or conductor in the final building installation. Thus, a cylindrical magnet 21 having a diameter of 0.398" will, when used in conjunction with a blueprint drawn to the scale of one eighth inch corresponding to one foot, produce a pulse for each five eighths inch of travel, which is equivalent to one pulse for five lineal feet.

Although different types of pacers may be employed, the use of a permanent magnet and a reed switch provides an accurate, dependable, and economical device. There are only two moving parts, and the accuracy of measurement is independent of temperature, body capacitance, moisture, foreign materials, and the like. It is contemplated however that pacers of different types, including wireless pacers, may be substituted for pacer 20 where conditions warrant such substitution.

"Devices" mode

When "devices" mode selection switch key 191 on keyboard 14 of FIG. 2a is depressed, the circuitry of the apparatus is arranged to permit forty-five different types of electrical devices to be counted. In contrast to the usual type of hand-operated digital counter, which must be read off and cleared after each different type of device has been counted, the apparatus of the present invention allows the estimator to count forty-five different types of devices in any order or entirely out of order.

Figure 3:
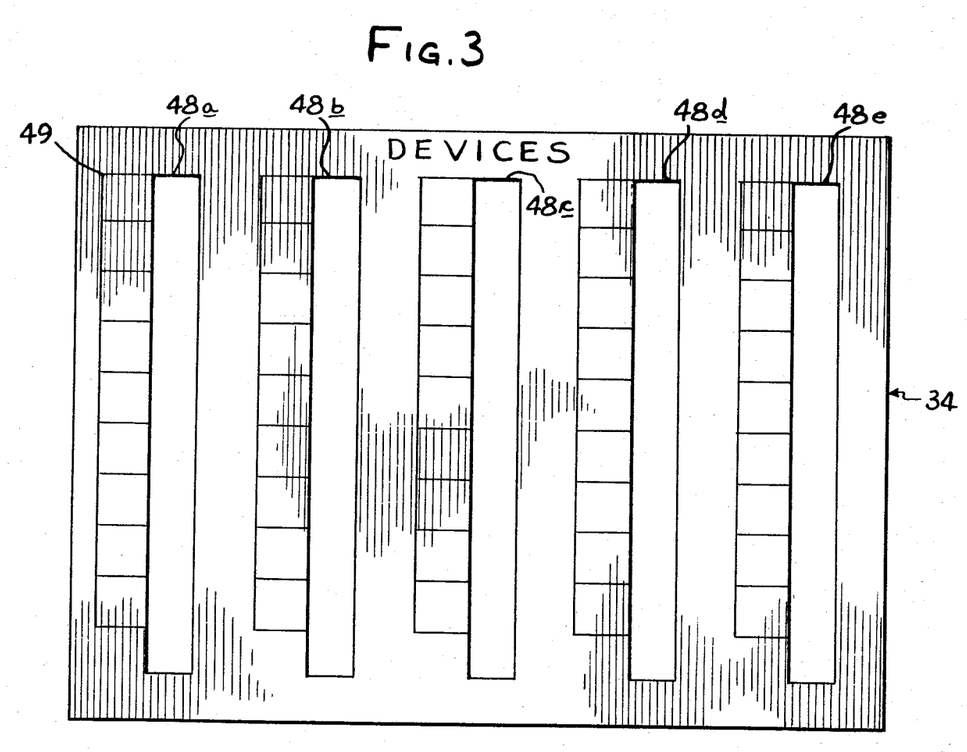
FIG. 3 is a representative overlay designed to be placed on the keyboard of FIG. 2.

A useful adjunct when employing the "devices" mode is overlay 34 shown in FIG. 3. This is a generally rectangular cardboard or rough-surface plastic sheet having a series of slots 48 through 48e so spaced that overlay 34 may be placed on top of keyboard 14 (FIG. 2) with selector keys or switches 101 through 160 protruding through slots 48. Spaces 49 are provided on overlay 34, one for each of the top nine keys, to receive an inked or penciled symbol corresponding to the device being counted. Thus, if an estimator is counting lamps with, say, switch key 101 and then wishes to count, say, wall outlets with switch key 102, the corresponding spaces 49 will show a lamp symbol alongside switch key 101 and a wall outlet symbol alongside switch key 102. By pressing switch key 102, each count is recorded on the "wall outlet" counter, and by pressing 101 the successive counts are recorded on a different counter corresponding to "lamps."

The overlay shown in FIG. 3 is used for the forty-five count-by-one counters then engaged when switch key 191 is depressed. Equivalent overlays are provided for each of the other three modes, although with these other modes certain of the switch keys 101–149 are disengaged, and hence inoperative, for the reason that lineal measurement pulses are directed to certain of the counters by the other switch keys on keyboard 14.

Figure 4:
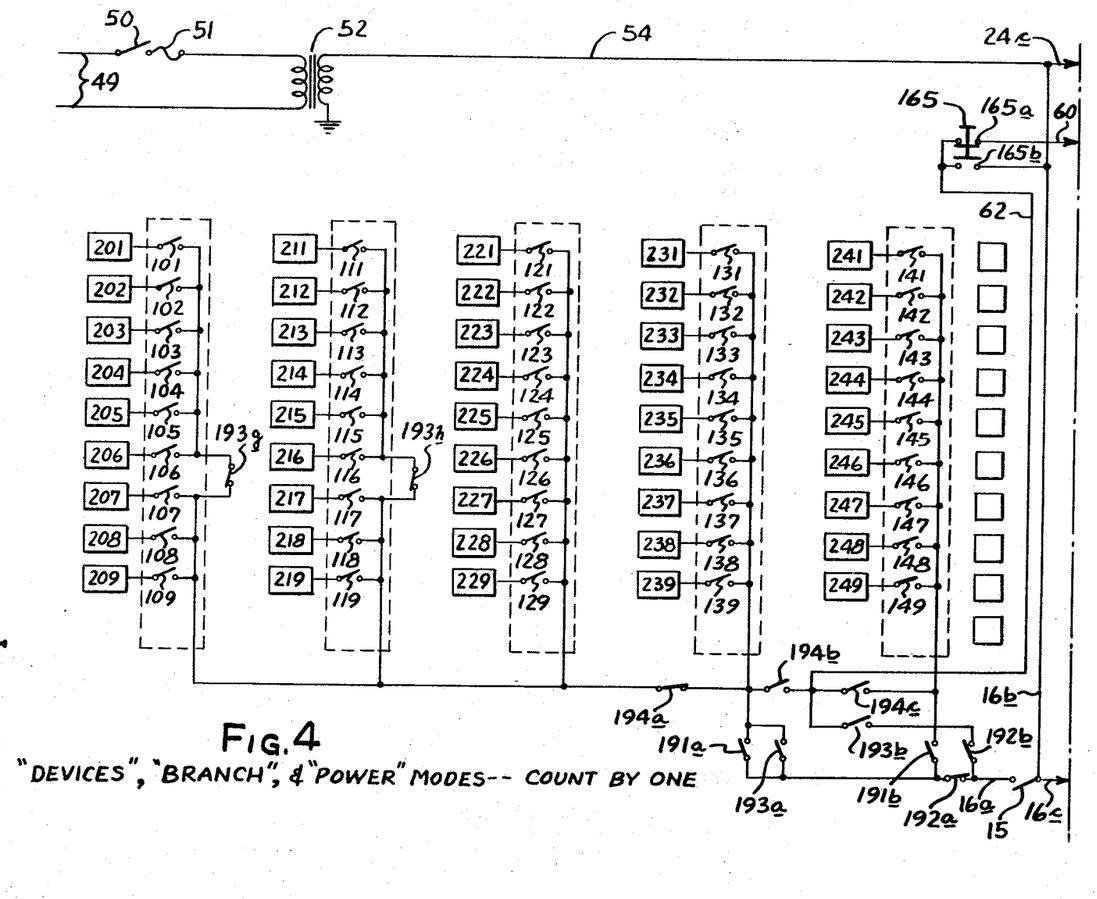
FIG. 4 is the left-hand portion of a circuit diagram of the invention, and constitutes one of three figures which may be placed alongside each other for a complete view of the inventive circuitry.

Turning now to FIG. 4, a circuit diagram is shown of the inventive device as it is set up for the "devices" counting mode. In this mode the circuits depicted in FIGS. 5 and 6 are not used.

Power is supplied to apparatus 11 from a 120-volt 60-cycle power line 49 through switch 50 and fuse 51. Transformer 52 reduces the voltage to 24 volts at 60 cycles, and is grounded to simplify subsequent wiring. ("Wire-add" button or key 165 is shown in FIG. 4 for simplicity of presentation but is ont connected in circuit.)

As may be seen from FIG. 4, power supplied from transformer 52 is transmitted via bus 54 to each of the keys or switches 101–109, 111–119, 121–129, 131–139, and 141–149, inclusive via lines 6a and b and the remote count switch 15 (see FIG. 1). Each of the respective switches is connected to a corresponding electromechanical digital counter or totalizer 201–209, 211–219, 221–229, 231–239, and 241–249, to accumulate the pulses or impulses transmitted by each manual closure of remote count switch 15. Thus, with switch or key 101 depressed, each closure of remote count switch 15 will increase the total on counter 201 by one unit, but with switch or key 102 closed and switch 101 open the counts are accumulated on counter 202.

"Devices" mode switch 191 is shown at the lower right-hand portion of FIG. 4 as a double pole single throw switch which is normally open until selector switch 191 is closed.

Parenthetically, switches 193a, b, g, and h are associated with the "power" mode, switches 194a, b and c with the "feeders" mode, and switches 192a and b with the "branch" mode, and then are used to connect various of the electromechanical counters 201–249 into the circuit. They are not used in the "devices" mode, and remain in the positions shown in FIG. 4.

The estimator will normally count all devices shown in the blueprints on which he is working before he switches apparatus 11 to any of the other three possible modes. Accordingly, after counting all of the devices shown on the blueprints, he will read the units or numbers appearing on counters 201–249 and transfer the entries to a work sheet. Each counter of course corresponds to a unique type of electrical device so there are no computations necessary and little opportunity for human error.

Apparatus 11 is then ready to be switched to the next mode, for example the "branch" mode.

*"Branch" mode*

In the "branch" mode the measuring and counting apparatus 11 is used for the first time to measure lengths or distances as well as to collect individual counts corresponding to electrical devices.

In accordance with a major objective of the invention, means are provided for pre-selecting conduit size and type, together with the desired number and size of conductors, by appropriate pre-setting of keyboard 14 (FIGS. 2 and 2a). Then, when the magnet wheel 21 of pacer 20 (FIGS. 5 and 7) is moved over a distance on a scaled blueprint, the apparatus 11 will simultaneously record on separate counters, (1) the length of the appropirate conduit, (2) the length of the appropriate number and size of conductor wire, and (3) the requisite number of conduit hangers in the event the conduit is exposed. At the same time, apparatus 11 is set up to record conduit terminations of the appropriate pre-selected conduit size and wall thickness.

To this end, "length"-measuring electrical impulses from pacer 20 (FIG. 5) are transmitted via line 24a to either or both of two sets or banks of several electromechanical counters, one set corresponding to the length of "conduits" of various sizes and wall thicknesses and the other to "conductors" of various numbers and sizes. If the installation requires both conduit and wire, depressing "conduit and wire" switch key 171 (FIG. 2a) transmits pulses to both sets; if conduit only is involved, depressing "conduit only" key 172 connects only one set, and if wire only is needed, depressing "wire only" key 173 connects only the other.

Further, if the conduit is exposed, thereby requiring a conduit hanger or support for each five feet of conduit, depressing "exposed conduit" 163 (FIG. 2a) connects another counter into circiut to receive impulses from pacer 20.

According to another aim of the invention, the same switch keys used to select a given conduit size and wall thickness simultaneously connect one counter from each of two sets of such counters into circuit, the first counter receiving "length" measuring impulses from magnet wheel 21 of pacer 20 (FIGS. 5 and 7) and the second receiving "units"-counting impulses from the manual switch 22 on the pacer. Counters in the respective sets correspond to a pre-selected size and wall thickness of conduit and to the same size and wall thickness of conduit terminations. Thus, as the estimator traces a line on a blueprint corresponding to a given conduit size and thickness, he can depress switch key 22 (FIGS. 5 and 7) to register a termination of the same size and the "branch" mode is used by the estimator in connection with smaller sizes of thin or heavy walled conduit, specifically ½", ¾", and 1." Additionally, the estimator presses appropriate switch keys corresponding to the number of conductors in each conduit, so that as pacer 20 traces a conduit shown on a blueprint the measuring and counting apparatus 11 records both the length of the conduit and the lengths of conductors. Furthermore, one electromechanical counter is assigned to enter a unit count for each five feet of any size conduit being measured in the "branch" mode, thus enabling an immediate determination of the number of conduit supports needed. A final operation permitted in the "branch" mode is the counting of eight devices, which is accomplished by depressing remote count switch 15 (FIG. 1).

Manual switch 22 on pacer 20 is used during "branch" operation to count conduit terminations. When appropriate switch keys on keyboard 14 are depressed to set up the measuring and counting apparatus 11 to record the length of a selected conduit size and wall thickness, appropriate circuitry is automatically connected to engage manual switch 22 with a counter which counts terminations having the same size and wall thickness as the selected conduit.

With "branch" mode selector switch 192 depressed and locked in place, switch keys 161–164, 171–179, and 181–189 become operative. The estimator depresses switch key 171, 172, or 173 depending on whether he wishes to measure conduit and wire, conduit only, or wire only. If he wishes to measure conduit plus wire or wire only he then depresses any one of switch keys 181–188 corresponding to the number of conductors, and one of switches 177–179 to select the appropriate conductor wire size.

If he has selected conduit plus wire or conduit only, he depresses either "thin wall conduit" switch key 161 or "heavy wall conduit" switch key 162. If the conduit is concealed in a structure or behind a wall he presses "concealed conduit" switch key 164, but if the conduit is to be exposed, he depresses switch key 163; only exposed conduit requires conduit supports, and consequently with "exposed conduit" switch key 163 depressed the apparatus 11 will automatically include one conduit support for each five feet of conduit.

Switch keys 174 through 176 are optionally available in the "branch" mode. These keys permit conduit size to be selected if a size other than the one specified by the appropriate municipal or national electrical code is desired. Otherwise the apparatus 11 will automatically select the smallest code-specified conduit size. If however a larger size is desired, then the appropriate switch key 174–176 is depressed; should the size be too small, apparatus 11 will automatically count the code size.

As indicated earlier, switch keys 141–148 are available in the "branch" mode to count devices one by one. Devices are counted with remote count switch 15. A particular advantage of the inventive circuitry is that different devices may be selected for counting without disturbing the various conduit size and type, or the various conductor size and number, previously set up on keyboard 14.

The circuitry associated with the "branch" mode is shown in FIGS. 4, 5, and 6, and attention is directed now to these figures. Switch key 192 which selects the "branch" mode is a single throw five-pole switch, that is, switches 192a through e as shown in FIGS. 4 through 6.

The operation of measuring and counting apparatus 11 in this mode is best illustrated by a typical example, which is representative of all such operations in the "branch mode." Assume, for example, that the blueprint calls for an installation involving eight conductors, each number ten wire size, placed within a conduit which is to be exposed. Assume also that the specification calls for half inch thin wall conduit. The estimator will have then depressed "eight conductor" switch key 182, "number ten wire size" switch key 179, "conduit and wire" switch key 171, "exposed conduit" switch key 163, "thin wall conduit" switch key 161, and "one half inch conduit size" switch key 174 on keyboard 14. He then proceeds to roll magnet 21 of pacer 20 over the line on the blueprint corresponding to this installation.

Rotation of magnet 21 causes electrical pulses to be generated in line 24, one pulse of each half rotation of magnet 21 and corresponding to five feet of length. These pulses are transmitted through lines 55 and 56.

Pulses from pacer 20 are used to measure conductor and conduit length and to count the number of conduit supports. For the measurement of conductor length, pulses from line 55 are accumulated on counter 221, associated with eight conductors per installation. Pressing "branch" mode selector switch key 192 has closed switch 192d; pressing "conduit and wire" switch key 171 has closed switch 171c; pressing "number ten wire size" switch key 179 has closed switch 179c, and pressing "eight conductor" key has closed switch 182g. Thus, pulses are transmitted to counter 221.

In addition, depressing "conduit and wire" switch key 171 has closed switch 171b; "number ten wire size" switch key 179 has closed switch 179b; "eight conductor" switch key 182 has closed 182d; and "thin wall conduit" switch key 161 has closed switch 161f. This completes the circuit to electromechanical counter 203 which measures the length of one inch, thin wall, conduit. (See Table I, below.)

It will be noted however that electromechanical counter 203 is being energized independently of the estimator's having depressed "one half inch conduit" switch key 174, and indeed it is found that counter 203 is associated with one inch thin wall conduit, rather than the desired half inch thin walled conduit. The explanation here is that the inventive apparatus 11 has built-in intelligence so that it is unable to accommodate half inch conduit for an eight conductor number ten wire installation, either because half inch conduit is impossible (too small) or because it is illegal (wiring code violation). So obviously the specification of half-inch thin wall conduit was in error, but the built-in intelligence of the apparatus has instead measured the correct one inch thin wall conduit. In the field the electricians would note the error and would provide one inch thin wall conduit but, although the estimator did not note it, the apparatus of the present invention has in fact included the corresponding lengths of necessary one inch thin wall conduit.

Engaging "exposed conduit" selector switch 163 and "branch" mode selector switch 192 has also closed the circuit including pacer 20, lines 24a and 56, and switches 163 and 192e. Pulses traveling along this line are transmitted to counter 239, which records the number of hangers necessary. Conventionally, one hanger is used for each five feet of exposed conduit, so that lineal distance or measurement counts from pacer 21 (fed through line 60 and switches 163 and 192e to counter 239) also provide a convenient and accurate total of the number of hangers required for the job.

In the example being discussed, setting up the appropriate keys on keyboard 14 has also set up the apparatus 11 to count conduit terminations of the proper size, specifically one inch thin wall. Depressing manual switch 22 on pacer 20 delivers a count-by-one pulse through the line 56 and thence through line 58 to switch 192c, which has been closed by depressing "branch" mode selector switch 192. "Conduit and wire" selector switch 171 has closed switch 171a; "number ten wire size" selector switch 179 has closed switch 179a; eight conductor switch 182 has closed 182a; and "thin wall conduit" selector switch 161 has closed 161c. Thus, each depression of manual switch 22 transmits a count-by-one pulse to electromechanical counter 213, which records the numer of one inch thin wall conduit terminations.

It was noted earlier that selector switch keys 141-148 are available during "branch" mode to count individual electrical devices in a unit or count-by-one manner. The circuitry for this is shown in FIG. 4, where it is seen that "branch" mode selector switch 192 has closed switch 192b, so that closing remote switch 15 and a selected device switch, that is, a device switch represented by switch keys 141-149, engages the appropriate electromechanical counters 241-249, respectively.

A great convenience of the apparatus while on "branch" mode is that the estimator can conveniently change conduit type or size, conductor number or size, exposed or concealed conduit selection, or the like merely by depressing a few selector keys. For instance, if in the example above it is no longer desired to house the conductors in a conduit, depressing "wire only" selector switch 173 will automatically disengage the counters corresponding to conduit measurement, terminations, and conduit supports. Should it then be desired to resume confining the conductors in a conduit, merely pressing "conduit and wire" selector switch key 171 again restores all the foregoing counting and measuring functions.

At the conclusion of the use of the "branch" mode, the estimator merely transfers the totals shown on electromechanical counters 201-249 to his work sheet and resets the counters to zero. For convenience, the following Table I indicates the function counted by each of the counters while in the branch mode. (The abbrivation "TWC" refers to "thin wall conduit"; "HWC" to "heavy wall conduit"; "TWT" to "thin wall termination"; "HWT" to "heavy wall termination"; "CBO" to "count-by-one" or devices count function; and "/C" to number of conductor.) The array of Table I corresponds to the array of counters on FIG. 1.

"BRANCH" MODE—TABLE I

| ½" TWC | ½" TWT | 8/C #10 | 2/C #14 | CBO |
|---|---|---|---|---|
| ¾" TWC | ¾" TWT | 2/C #12 | 3/C #14 | CBO |
| 1" TWC | 1" TWT | 3/C #12 | 4/C #14 | CBO |
| ½" HWC | ½" HWT | 4/C #12 | 5/C #14 | CBO |
| ¾" HWC | ¾" HWT | 5/C #12 | 6/C #14 | CBO |
| 1" HWC | 1" HWT | 6/C #12 | 7/C #14 | CBO |
| 2/C #10 | 5/C #10 | 7/C #12 | 8/C #14 | CBO |
| 3/C #10j | 6/C #10 | 8/C #12 | 9/C #14 | CBO |
| 4/C #10 | 7/C #10 | 9/C #12 | Conduit Supports | |

*"Power mode"*

Measuring and counting apparatus 11 is set up for the "power mode" by depressing "power" mode selector switch 193 of FIG. 2. This enables the apparatus to measure three-conductor power line conduits and provides numerous "count-by-one" counters as well as eight lineal counters. Additionally, hangers are counted for exposed conduit, as in the case of the "branch" mode.

There is however no provision for selecting conduit and wire combinations other than three conductors in each conduit, and none is necessary inasmuch as all motor power lines are three phase three conductor systems. Thus, the estimator using apparatus 11 in the "power" mode need only select either thin wall conduit or heavy wall conduit by depressing switch key 161 or 162 respectively, and select whether the conduit is exposed or concealed by depressing switch keys 163 and 164 (FIG. 2a). As before, "exposed conduit" switch key 163 counts one hanger for each five lineal feet of such conduit. Conduit size is selected with switch keys 151, 152 or 153.

Inasmuch as a large number of electrical devices are commonly encountered during the estimation of "power" line requirements, twenty-one different count-by-one or unitary count electromagnetic counters are provided. These counters are selectively engaged by pressing any one of switch keys 107–109, 117–119, 121–129, or 131–138. Devices are counted by depressing switch 15 (FIG. 1) as in the "branch" mode.

Provision is also made to select any one of eight electromechanical counters to record simultaneously a lineal measure of a preselected conductor size corresponding to the lineal measure being taken with pacer 20. Switch keys 141 through 148 are used for such selection and connect electromechanical counters 241–248 (FIG. 4) into the circuit. Thus each pulse delivered by pacer 20 is recorded in one of the designated counters, in addition to being recorded by the counter associated with the appropriate conduit size and wall thickness.

Terminations are counted in the "power" mode by pressing manual switch 22 on the top of pacer 20, as was done in the "branch" mode.

Turning now to FIGS. 4 through 6, let it be assumed for example that the estimator wishes to determine the requirements of thin wall, concealed, half inch conduit using number six wire. He will previously have assigned switch key, say, 141, to measure number six wire, and so will press this key. He will then press "thin wall conduit" switch key 161; "concealed conduit" switch key 164; and "one-half inch conduit size" switch key 151 (FIG. 2). Since there are three and only three conductors per conduit it is unnecesary to select number of conductors per conduit.

Three-conductor number six wire is measured using counter 241. This counter has been engaged by closing switch 141 and "branch" mode selector switch 192b.

On FIG. 5, pulses from the reed switch 45 and magnet 21 of pacer 20 are transmitted via lines 24a, 60, and 61 through now-closed "thin wall conduit" switch 161a, "power" mode selector switch 193c, and "one-half inch conduit size" switch key 151a to electromechanical counter 201, which, in this mode, is counting one-half inch thin wall conduit.

Terminations, as noted before, are counted by depressing manual switch 22 on pacer 20. Pulsations are conducted via lines 24b and 56 through now-closed "thin wall conduit" switch 161b, "power" mode selector switch 193e, and "one-half inch conduit size" selector switch 151c to counter 211, which counts one-half inch thin wall terminations. In similar manner, depressing other switch keys in the "power" mode sets up the counting circuit to count other sizes and wall thicknesses of conduit and corresponding terminations, etc.

Conduit supports are accumulated on electromechanical counter 239, one support for each five lineal feet of conduit and wire, if "exposed conduit" selector switch 163 has been depressed.

Adverting to FIG. 4, depressing "power" mode selector switch 193 opens switches 193g and h and closes switches 193a and b. Accordingly, each time remote count switch 15 is depressed a pulse is transmitted to one of the counters that had previously been selected by depressing one of switch keys 107–109, 117–119, 121–129, or 131–139, and so enabling electrical devices to be counted.

After having completed accumulating "power" conduit and devices requirements of the job, the estimator will transfer the counts on electromechanical counters 201–249 to his work sheet, and proceed with subsequent steps of the estimation. Table II below identifies the electromechanical counters, and is arranged in an array corresponding to the array shown in FIG. 1. As before, "TWC" denotes "thin wall conduit," "HWC" is "heavy wall conduit," "TWT" is "thin wall termination," "HWT" is "heavy wall termination," and "CBO" is "count-by-one" or unit devices. "LIN" is lineal feet of three-conductor wires.

"POWER" MODE—TABLE II

| ½″ TWC | ½″ TWT | CBO | CBO | LIN |
|---|---|---|---|---|
| ¾″ TWC | ¾″ TWT | CBO | CBO | LIN |
| 1″ TWC | 1″ TWT | CBO | CBO | LIN |
| ½″ HWC | ½″ HWT | CBO | CBO | LIN |
| ¾″ HWC | ¾″ HWT | CBO | CBO | LIN |
| 1″ HWC | 1″ HWT | CBO | CBO | LIN |
| CBO | CBO | CBO | CBO | LIN |
| CBO | CBO | CBO | CBO | LIN |
| CBO | CBO | CBO | Hangers | |

For the final portion of the estimating job the estimator converts to the "feeders" mode.

"Feeders" mode

Converting to the "feeders" mode is accomplished merely by depressing "feeders" mode selector switch 194 on keyboard 14 (FIG. 2a), and permits the estimator to enter the appropriate feeder conduit sizes, etc., on the keyboard.

Since the feeder conduits are generaly quite large, selector keys 154 through 159 are marked with conduit sizes "one and one-quarter inches," "one and one-half inches," "two inches," "two and one-half inches," "three inches," and "three and one-half inches." It is rare that larger feeder conduits are encountered, but if they are an unused feeder conduit size selector switch key can be used temporarily to record the length of such larger conduit.

As in the case of the "branch" and "power" modes, the estimator selects either thin wall conduit by depressing switch key 161 or heavy wall conduit with switch key 162, and determines whether the conduit is to be exposed or concealed, indicating his choice by depressing switch keys 163 or 164, respectively. Because widely different sizes of conduit are encountered in the "feeders" mode the apparatus automatically counts small conduit hangers for conduit sizes of one and one quarter inches through two inches, and large conduit hangers for conduit sizes of two and one half inches to three and one half inches; one hanger is provided for each five lineal feet of conduit, and selection between small hangers and large ones is made automatically when one of switch keys 154–156 or 157–159, respectively, is depressed to select conduit size.

Conductor sizes are not specified in the "feeders" mode for the reason that widely different sizes and differing numbers of conductors per conduit are encountered. Instead, blue switch keys 131–138 and green switch keys 141–148 are connected in circuit with pacer 20 and permit sixteen different sizes or numbers of conductors to be measured.

No provision is made in the "feeders" mode for using remote count switch 15. Instead, manual entry of two additional quantities is provided on keyboard 14 (FIG. 2a) by means of spring-return "wire add" switch key 165 and "ells" switch key 166.

"Wire add" switch key 165 is connected in circuit with pacer 20 and is used when the estimator wishes to provide an additional five feet of conductor wire at the beginning and/or end of a conduit so as to permit the electrician to have sufficient wire beyond the end of a conduit to make his connections. As will be shown, "wire add" switch key 165 is connected in the same circuit as electromechanical counters 231–249 and switch keys 131–138 and 141–148. Accordingly, if for example switch key 144 designates four number ten conductors, each rotation of magnet 21 in pacer 20 will transmit two pulses to electromechanical counter 244, and each time "wire add" switch key 165 is pressed an additional pulse (corresponding to five feet of wire) will be transmitted to the same counter.

"Ells" switch key 166 is associated with a series of counters where each counter represents an ell for a given conduit size and wall thickness. The appropriate counter to count ells is selected automatically when the estimator selects conduit size and conduit wall thickness by depressing one of switch keys 154–159 and one of switch keys 161–162 on keyboard 14, (FIG. 2a). Thus, when the estimator is tracing or following out, say, two inch heavy wall conduit, each time "ells" switch key 166 is depressed a count will be recorded on the two inch heavy wall conduit ell counter 226.

As in the case of the "branch" and "power" modes, manual switch 22 on pacer 20 (FIG. 1 or FIG. 5) accumulates terminations corresponding to each conduit size and wall thickness. The circuitry for this is similar to that for the "ells" selector switch 166 in that setting up keyboard 14 (FIG. 2) for a given conduit size and wall thickness automatically arranges the circuitry of apparatus 11 to accumulate terminations of the corresponding size and wall thickness.

For convenience, an overlay similar to that shown as FIG. 3 may be used for the "feeders" function as well as for the "devices," "branch," and "power" functions.

Circuitry for the "feeders" mode is shown in FIGS. 4 and 5, and attention is now invited to these figures. Depressing "feeders" mode selector switch 194 will be seen to have opened switch 194a and closed switches 194b through h inclusive.

Assume for example that it is desired to determine the requirements of three inch, heavy wall, exposed conduit, and also to measure the necessary length of conductor represented (arbitrarily) by switch key 146. The operator will have pressed "three inch conduit size" switch key 158, "heavy wall conduit" switch key 162, "exposed conduit" switch key 163, and switch key 146.

To indicate the requisite lengths of three inch heavy wall conduit, pulses from pacer 20 will be transmitted via lines 24a, 60, and 61 to now-closed "heavy wall conduit" switch 162, "feeder" mode switch 194e, and "three inch conduit" switch key 158b, where they will be accumulated on counter 208.

Pulses to record conductor length will also be transmitted from pacer 20 via lines 24a, 60, "wire add" switch key 165 (which, as shown in FIG. 4, completes the circuit whether in open or closed position), lines 62, now-closed "feeder" switches 194b and c, and now-closed switch key 146 to counter 246. Counter 246 will thus be accumulating "length" or "distance" counts proportional to the distance traversed by pacer 20, that is, proportional to the required length of three-wire conductor of specified size.

When it is desired to add, say, ten feet of conductor (that is, conductors then being recorded on counter 246), "wire add" switch key 165 is depressed twice. This transmits two pulses (via "wire add" switch 165b) to lines 62 and 64 and then to counter 246, increasing the count by two units or ten feet.

Since the estimator has pressed "exposed conduit" switch key 163, the apparatus 11 will accumulate a count corresponding to one hanger for each five feet of conduit length. For this to occur, pulses from pacer 20 are transmitted via conduit 24a through now-closed "exposed conduit" switch 163 and thence through now-closed "three inch conduit size" switch 158f to large hanger counter 249.

Conduit terminations are likewise accumulated in the "feeders" mode, again by depressing manual switch key 22 on pacer 20. Individual pulses are transmitted via lines 24b and 56 through now-closed "heavy wall conduit" switch key 162b, "feeders" mode selector switch 194g, and "three inch conduit" switch key 158d to three inch heavy wall termination counter 218.

It will be apparent that one counter from each of three different sets of counters (201–209, 211–219, and 221–229) is selected merely by pressing one of switch keys 154–159 and one of keys 161–162. Thus, selection of conduit size and type with merely two keys permits measurement of that size and type of conduit, permits the corresponding size and type of terminations to be counted, and also permits the appropriate size and type of conduit ells to be counted.

In like manner the estimator will change keyboard 14 settings to determine materials requirements for different conduit sizes and thicknesses and different conductor wire sizes and numbers of conductors per conduit, as well as to provide hangers when required. Upon completion of such work, he reads the totals on the various counters and transfers the readings to his work sheet. Table III below presents the types of counts recorded for the respective counters, the arrangement of Table III being the same as the counters shown on panel 12 of FIG. 1.

"FEEDERS" MODE—TABLE III

| 1¼″ TWC | 1¼″ TWT | 1¼″ TWE | LIN | LIN |
|---|---|---|---|---|
| 1½″ TWC | 1½″ TWT | 1½″ TWE | LIM | LIN |
| 2″ TWC | 2″ TWT | 2″ TWE | LIN | LIN |
| 1¼″ TWC | 1¼″ HWT | 1¼″ HWE | LIN | LIN |
| 1½″ HWC | 1½″ HWT | 1½″ HWE | LIN | LIN |
| 2″ HWC | 2″ HWT | 2″ HWE | LIN | LIN |
| 2½″ HWC | 2½″ HWT | 2½″ HWE | LIN | LIN |
| 3″ HWC | 3″ HWT | 3″ HWE | LIN | LIN |
| 3½″ HWC | 3½″ HWT | 3½″ HWE | Hangers 1¼″ 2″ | Hangers 2½″ 3½″ |

When the above work is finished, it is a simple matter to determine the required lengths of each size and type of conduit, the required lengths of each size of conductor, the numbers of each size of supports, hangers, and ells, and the number of each type of electrical device counted in all four modes. By multiplying each quantity by the material price, and by adding the estimated installation labor and overhead, dollar totals are obtained which, when a grand total is taken, give the estimated cost of a job.

While the invention has been described in conjunction with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

I claim as my invention:

1. A distance measuring and unit counting device comprising:
   means for producing electrical pulses in proportion to a distance,
   means for producing individual electric pulses,
   a plurality of means for counting electrical pulses,
   a plurality of first switch means operable in each of a plurality of predetermined modes for connecting at least one of said pulse counting means with at least one of said pulse producing means,
   and second switch means for selecting one of said modes, whereby each of said pulse counting means is available for a different counting operation in each of said plurality of modes.

2. The measuring and counting device of claim 1 wherein said pulse counting means is an electromechanical counter.

3. Device of claim 1 wherein in at least one of said modes, said first switch means are adapted to connect said pulse counting means only with said individual pulse producing means, and in at least one other of said modes said first switch means are adapted to connect said pulse counting means with both of said pulse producing means.

4. Device of claim 1 wherein in at least one of said modes said first switch means are adapted to simultaneously connect a plurality of said pulse counting means with said proportional pulse producing means.

5. Device of claim 1 wherein in at least one of said modes said first switch means are adapted to simultaneously connect one of a first set of said pulse counting means and one of a second set of said pulse counting means with said proportional pulse producing means.

6. Device of claim 1 wherein in at least one of said modes said first switch means are adapted to simultaneously connect at least one of said pulse counting means with said pulse producing means and with an individual pulse producing means.

7. For use with an apparatus for measuring a distance, manually operated means for producing electrical signals in proportion to a distance, comprising:
 a rotatable magnetic wheel having its magnetic poles along a diameter of said wheel, said magnetic wheel being adapted to be rolled over a distance,
 and electrical switch means magnetically responsive to said magnetic wheel, whereby rotation of said wheel actuates said switch means to produce electrical signals in proportion to said distance.

8. For use with an apparatus for measuring a distance, magnetically responsive means for producing electrical signals in proportion to a distance, comprising:
 a non-ferrous casing,
 a rotatable magnetic wheel journaled to said casing and having its magnetic poles along a diameter of said wheel, said magnetic wheel being adapted to be rolled over a distance,
 and magnetically responsive electrical switch means in said casing and in magnetic proximity to said magnetic wheel whereby rotation of said wheel opens and closes said switch means to produce electrical signals in proportion to said distance.

9. Manually operated means for producing electrical pulses in proportion to a distance and for producing individual electrical pulses in response to a manual signal, comprising:
 a non-ferrous casing,
 a rotatable magnetic wheel journaled to said casing and having its magnetic poles along a diameter of said wheel, said magnetic wheel being adapted to be rolled over a distance,
 magnetically responsive electrical switch means in said casing and in magnetic proximity to said magnetic wheel whereby each rotation of said wheel actuates said switch means to produce electrical pulses in proportion to said distance,
 and second electrical switch means carried by said casing for said manual signals.

References Cited
UNITED STATES PATENTS 2,207,506 7/1940 Cox ______________ 235—92
3,342,979 9/1967 Wright ____________ 235—92

MAYNARD R. WILBUR, *Primary Examiner.*

G. J. MAIER, *Assistant Examiner.*